C. E. Warner,
Making Matches,
No. 2,700.    Patented July 2, 1842.
Sheet 1- 2 Sheets.
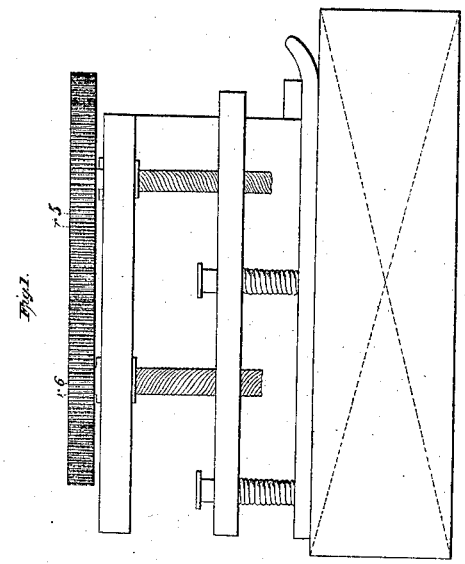
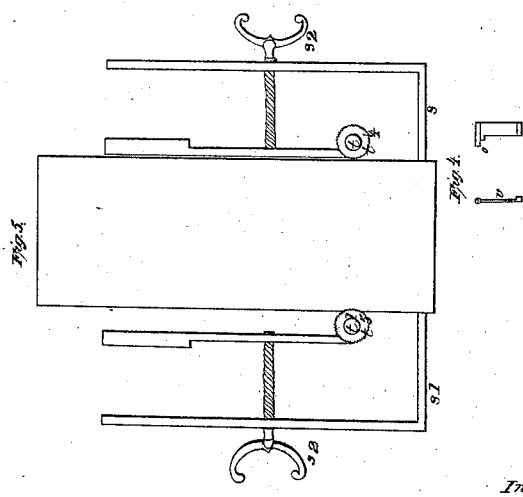
Witnesses:    Inventor:

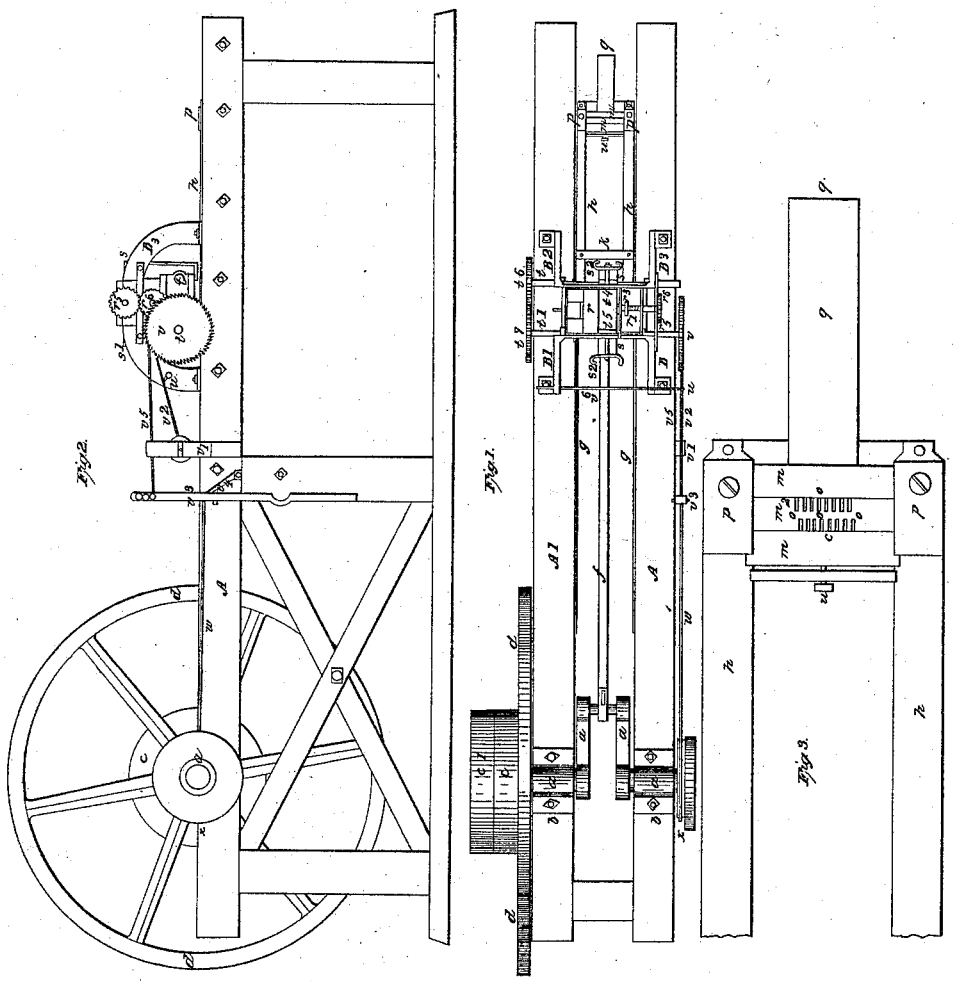

UNITED STATES PATENT OFFICE.

CHAUNCEY E. WARNER, OF NEW YORK, N. Y., ASSIGNOR TO JOHN H. STEVENS, OF NEW YORK, N. Y.

MACHINE FOR CUTTING MATCH-SPLINTS.

Specification of Letters Patent No. 2,700, dated July 2, 1842.

*To all whom it may concern:*

Be it known that I, CHAUNCEY E. WARNER, of the city, county, and State of New York, machinist, have invented and applied to use certain new and useful Improvements in Modes of Cutting Round Match Sticks or Splints, and for which I seek to have Letters Patent of the United States issued to JOHN H. STEVENS, of the said city, match manufacturer, as the assignee of my right and title thereto.

The machine is fully described in the following specification, and in the drawings attached, wherein—

Figure 1 is a plan or top view of the machine. Fig. 2 is a side elevation taken on the side of the plan.

These represent the general construction and position of the parts employed, the other figures are hereafter separately referred to, and the same letters and numbers, as marks of reference apply to the same parts, in all the several figures.

A and $A^1$ represent the frame on which the working parts are mounted for use.

$a$, $a$, $a$, $a$, is the principal crank and shaft which runs across the frame A and $A^1$ working in bearings $b$, $b$, and projecting out from the side of the frame $A^1$ long enough to take the fly wheel $d$, $d$, and fast screw $c$ and loose screw $c^1$, by which the machine is to be worked by a belt or other attachment, to any prime mover. On the side of the frame A the said shaft projects out long enough to take an eccentric wheel $x$ hereafter referred to.

$f$ is a connecting rod from the crank and shaft $a$, $a$, $a$, $a$, to the slide carriage $h$, $h$, which works on ways $g$, $g$, inside the main frame A and $A^1$. On the back or outer end of the carriage $h$, $h$, are three carrier plates $m$, $m$, $n$, and $m$, lying crosswise of the carriage and held in their places horizontally by a set screw $n$ and vertically by two small pieces $p$, $p$. The middle carrier plate $m$, $n$ is fitted with two rows of small slots, each row running lengthwise of the carrier plate $m$, $n$, but each separate slot in each row runs lengthwise of and in a separate longitudinal line, with the carriage $h$, $h$, see Fig. 3. In these slots cutting cylinders $o$ $o$ $o$ $o$ (see also Fig. 4 Sheet 2) are fitted and held in place in each slot, the vertical portion being secured by shoulders on the shank above and below, and below the carrier plate $m$, $n$. The longitudinal position of the cutters are held in the slots by the plates $m$, $m$— the position of these parts are more fully shown in half size in the detached Fig. 3.

The form of the cutting cylinders $o$ $o$ are shown in full size both in section and length in the detached Fig. 4, Sheet 2. Both ends of the cylinders and both edges of the shanks immediately underneath the cylinders are brought to a cutting edge. The foremost end of the cylinders are brought to an edge so as to cut the splints as they go forward through the wood which is operated upon. The foremost edge of the shank is brought to an edge in order to allow it to pass through the wood free and with ease.

The back end of the cylinders and back edges of the shanks are brought to an edge so as to allow them to repass through the wood without taking with them any fuz, slivers, or tearing off the shell, or chip, which is left on the block of wood for the knife $k$ to remove, after each successive cut with the cylinders.

The knife $k$ is placed and runs across the carriage $h$, $h$, in front of the carrier plates $m$—$m$ $n$, and $m$ in order to clear off the chips or uneven surface, thus preparing the block at every revolution of the machine for the cutters to operate upon. Back of the carrier plates $m$, $m$ $n$, and $m$ and attached to the carriage $h$ $h$ is a receiving and delivering trough $g$ to receive and deliver the splints at every revolution of the machine. Above the carriage $h$, $h$, is a feeding box for the wood, having four standards B, $B^1$, $B^2$, $B^3$, each standard being made stationary by a bolt to the main frame A and $A^1$; in this feeding box on the side next $B^1$ and $B^2$ is a stationary guide $r$ which the wood is placed against when put into the box. In the opposite side of the box is a spiral spring guide $r^1$, $r^3$. This spiral spring guide is shown in Sheet 3, Fig. 1, and is operated upon by two screws, one right and the other left handed, which runs through the side of the box B, $B^3$, Fig. 1, Sheet 1, being geared together by two pinions $r^5$, $r^6$ shown Fig. 1, Sheet 1 and Fig. 1, Sheet 3, on the outside of the box. This spring guide being operated upon by the screws will admit as also keep close to the guide $r$ Fig. 1, Sheet 1, a block of wood any thickness which the operator may choose to put in the box.

Two fluted feeding rollers $t^4$ and $t^5$ are fitted on shafts $t$ and $t^1$ in and near the bottom of the box lying on a horizontal line with each other and crosswise of the main frame A and $A^1$. The shafts $t$ and $t^1$ are geared together by two tooth wheels $t^6$ and $t^7$ on the side of the frame $A^1$. On the side of the frame A the shaft $t^1$ has a ratchet wheel $v$ fitted on it. These fluted rollers $t^4$ and $t^5$ being made fast on the shaft $t$ and $t^1$ serve when turned by the ratchet wheel $v$ to draw the block of wood (which is placed in the feeding box) down for the cutting cylinders to operate upon. The fluted rollers are shown in longitudinal section $t^4$ and $t^5$ Fig. 5 Sheet 2.

Two clamps $s$ and $s^1$ are hung on studs. One in front of the cutting box and the other on the back and on a horizontal line with each other. The lower end of these clamps turn in and run under the feeding rollers $t^4$ and $t^5$ far enough to meet the block of wood below the rollers and are tightened up against the wood by two steady screws $s^2$ and $s^2$—the clamps serve to hold the last part of the block, after it is fed down below the feeding rollers and while the second block of wood feeds down the remaining part of the first until it is all cut up by the cutting cylinders and knife before described.

The motion is given to the fluted feeding rollers through the ratchet wheel $v$ (see Fig. 2) by the horizontal pawl $v^5$ the vertical lever $v^3$ and horizontal rod $w$ which is connected to the eccentric wheel $x$. Under the horizontal pawl $v^5$ is a standard $v^1$ made fast to the side of the frame A with a fixed pawl $v^2$ hung on a stud in a slot in the standard $v^1$. The fixed pawl $v^2$ Fig. 2 is calculated to prevent any recoil of the ratchet wheel $v$. The vertical lever $v^3$, and horizontal pawl $v^5$ is kept back to a stop by a counter spring $v^4$ when the horizontal rod $w$ is not operating on it. Beneath these pawls, a cross rod $v^6$ Fig. 1 goes through the standards B, and $B^1$ having on the end $B^1$ a small crank handle, and at the other end a crooked counter or check pawl $u$, Fig. 2 which underlies the pawls $v^2$ and $v^5$ Fig. 2 and on being turned upward, raises both the other pawls, out of gear with the ratchet wheel $v$.

The operation of the machine thus made and constructed is as follows, the fluted feeding rollers $t^4$ and $t^5$ are to be adjusted that any convenient length of material may pass between them and the longitudinal gage stops $s$ and $s^1$ are adjusted to correspond.

The spiral spring guide $r^1$ $r^3$ is to be adjusted to the general thickness of the wood, which is to be entered and pushed down until the fluted rollers $t^4$ $t^5$ hold it endwise of the grain between them. When motion is given to the machine the knife $k$ being placed and working in advance of the cylinder cutters, and adjusted to cut one thickness of a match splint below the level of the cylinder cutters $o$ $o$, will, previous to each cut of the cylinders, take off the chips of the former cut of the cylinders, so as to leave a clear face for the cylinder cutters $o$ $o$ to act on, and these being rapidly projected endwise of the grain through the wood, the substance of a match is formed by the wood passing through each cylinder cutter, the substance of the wood between each cylinder being at the same time divided by the small cutting edge in the front of the shank beneath each cylinder, so that each cylinder appears charged with a match splint on its return, and the instant this motion is completed the eccentric $x$ sends the rod $w$, lever $v^3$, and pawl $v^5$ forward. These give the ratchet wheel $v$ motion, by which the fluted rollers $t^4$ $t^5$ are started around so much as to draw down the wood the thickness of a splint. The knife $k$ now cames up, and clears the chips, separating and detaching the same from the main block of wood operated upon, and causing said chips to fall beneath the machine apart from the splints, and by the progress of the motion the splints in the cylinders are projected out, into the tray $q$. Each successive cut of the cylinder drives those out made by the previous motion, and it is the rapidity of the motion, and the sudden check, at the end of the return movement which projects the made splints out of the tray $q$, into a receiving box placed at the end of the machine for that purpose.

I claim—

1. The application and the use of the cutting cylinders, or cylinder $o$ $o$ $o$ $o$, in combination with the cutting knife $k$, or other instrument operating substantially the same as herein described.

2. I claim the application and the use of the cylinders or cylinder, with a cutting tool as above set forth, in combination with the said mode, or other mode substantially the same, for the purposes of feeding the wood, when operated upon as is herein described.

3. I claim the application and use of the cutting cylinders Fig. 4, Sheet 2, in combination with a stem or shank having vertical edges, for the purpose of dividing the wood, substantially the same as is herein set forth.

In witness whereof I have hereunto set my hand, in the city of New York this eleventh day of February 1841.

CHAUNCEY E. WARNER. [L. S.]

Witnesses:
M. LACOUR,
H. CANDLAND.